Patented Oct. 30, 1928.

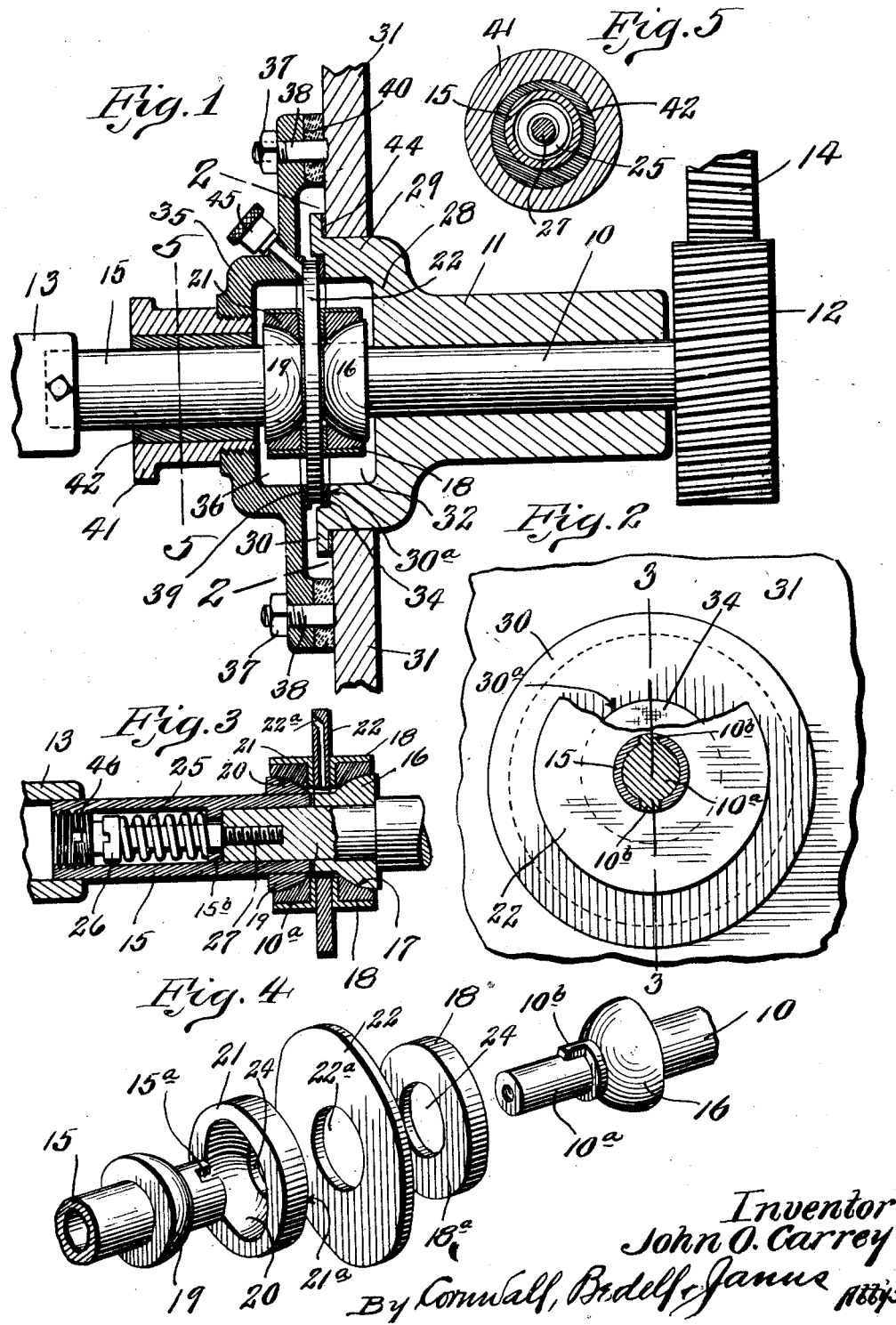

1,689,912

UNITED STATES PATENT OFFICE.

JOHN O. CARREY, OF ST. LOUIS, MISSOURI, ASSIGNOR TO CARREY-MORSE ENGINEERING COMPANY, OF ST. LOUIS, MISSOURI, A CORPORATION OF MISSOURI.

BEARING AND SEAL FOR SAME.

Application filed February 25, 1924. Serial No. 695,031.

This invention relates to new and useful improvements in bearings and seals for same, and the objects of the invention are to provide a seal for shafts and the like which will effectively seal the bearings and prevent the fluid from escaping therethrough, and to provide a seal which is of durable construction and can be economically manufactured.

Further objects of the invention are to provide a seal which is flexible so that a shaft or other element with which said seal cooperates is permitted a certain degree of transverse movement relative to the wall in which it is mounted.

Still further objects of the invention are to provide a shaft bearing adapted to be adjustably mounted in the wall of an apparatus in eccentric relation to the shaft whereby by manipulating said bearing said shaft may be adjusted, and to provide a flexible seal cooperating with said shaft and said bearing and sealing the latter so that the fluid contained in said apparatus is prevented from escaping therefrom.

With these and other objects in view, my invention consists in certain novel features of construction and arrangement of parts, hereinafter more fully described and claimed, and illustrated in the accompanying drawings, in which—

Figure 1 is a longitudinal cross section through the bearing.

Figure 2 is a transverse cross section taken on line 2—2 of Figure 1.

Fig. 3 is a longitudinal cross section through the seal taken on line 3—3 of Figure 2.

Figure 4 is a perspective detail view showing the seal in disassembled relation.

Figure 5 is a transverse cross section taken on line 5—5 of Figure 1.

Referring by numerals to the accompanying drawings, 10 indicates a short section of shaft journaled in bearing 11 and provided on its inner end with a pinion 12 which is designed to mesh with a gear 14 of an apparatus to be driven. The outer end of shaft 10 extends beyond bearing 11 and has a reduced portion 10ª which is designed to fit into one end of a tubular member 15, the opposite end of which is designed to receive a coupling 13 whereby said tubular member may be connected to the driving shaft, such as a motor shaft. The inner end of tubular member 15 is provided with notches 15ª which are adapted to be engaged by projections or keys 10ᵇ formed on the shaft 10, thereby establishing positive operative connection between tubular member 15 and shaft 10. Shaft 10 is provided adjacent to the reduced portion 10ª with an enlargement or head 16 which is semispherical in shape and has a bearing in the concave face 17 of a member 18. A semispherical enlargement or member 19 is formed on tubular member 15 and is spaced a suitable distance from member 16.

Member 19 has a bearing in the concave face 20 of a sealing or socket member 21 which is oppositely disposed relative to member 18. The opposed faces 18ª and 21ª of the respective sealing members are formed flat and bear against the flat sides of washer or sealing plate 22 which is interposed between said members 18 and 21. Plate 22 is provided with a central opening 22ª and members 18 and 21 are provided with central openings 24 for the accommodation of shaft 10 and tubular member 15. The shaft sections 10 and 15 are held in assembled relation by means of an expansion spring 25 which is arranged in section 15 and has its one end bearing against an annular shoulder 15ᵇ formed in said section and having its opposite end bearing against a head 26 of a screw 27 which is threaded in the reduced portion 10ª and projects into tubular section 15.

Spring 25 not only serves to maintain the shaft sections in their operative relation but also exerts pressure through members 16 and 19 against sealing members 18 and 21 and maintains the latter in proper sealing engagement with plate 22. The outer end of bearing 11 is provided with an enlarged portion 28 having a cylindrical portion 29 which terminates in a laterally presented flange 30 which is designed to abut the outer face of a wall 31 when said portion 29 is fitted into the opening formed in said wall. The enlarged portion 28 is formed with an outwardly presented recess 32 to accommodate the semi-spherical member 16 and sealing member 18 and the face of flange 30 is formed with a circular shouldered portion 30ª for receiving the marginal portion of plate 22 and a sealing gasket 34 which is interposed therebetween and seals the recess 32.

A cover plate 35 is provided with a recessed portion 36 for the accommodation of member 19 and sealing member 21 and bears against the outer face of plate 22 and holds it and bearing 11 in position on wall 31. Cover plate 35 is held in position by nuts 37 which engage the threaded shanks of bolts or pins 38 seated in and projecting from wall 31. A gasket 39 is interposed between plate 22 and cover 35 and seals the recess 36 and a gasket 40 is arranged between wall 31 and the marginal portion of cover plate 35 and forms an additional seal so that any fluid which might escape from recesses 32 or 36 is prevented from escaping to the atmosphere. Cover plate 35 is provided with a threaded central opening in which is screw-seated the threaded portion of a bearing 41 having a detachable bushing 42 arranged therein. The bore of bearing 41 is concentric with cover plate 35 and the shaft opening in bushing 42 is formed eccentric relative to the outer periphery of said bearing and to the bore of bearing 41 so that it may be adjusted relative to the tubular section 15 when the axis of the latter is changed by adjusting the eccentric portion 29 in the opening of wall 31.

A gasket 44 is interposed between wall 31 and flange 30 and seals the opening in which the bearing is mounted. Parts operating in chamber 32 are lubricated by oil which works its way thereinto from the casing in which pinion 12 operates through bearing 11. This chamber is sealed by gasket 34 and by member 18 which has a sealing engagement with semi-spherical member 16 and plate 22. Parts arranged in recess or chamber 36 are lubricated by grease lubricant admitted thereinto by means of a force cup 45 arranged in cover 35 and communicating with a duct 22ª formed in plate 22 and opening into said recess as shown in Figure 3. Member 21 arranged in this recess cooperates with semi-spherical member 19 and plate 22 and forms an additional seal so that a double seal is provided for successfully sealing the bearing through which the shaft operates and preventing the fluid contained in casing 31 from escaping therefrom. Screw 27 is locked in position by a plug 46 which is screw-seated in tubular section 15 and bears against the head 26 of said screw.

In making the ball and socket sealing members, the convex members are preferably formed of wear-resisting metal, such as steel, while the concave members are preferably made in the form of cups which are then filled with suitable metal such as babbitt and properly finished so as to form accurate seats for said convex members.

A bearing constructed according to my invention is of durable construction, can be easily adjusted so as to properly position the shaft, and is effectively sealed, thereby eliminating all danger of the fluid contained in the casing of leaking through said bearing.

By making certain of the sealing members convex or semi-spherical shape and the other sealing members cooperating therewith concave shape, a ball and socket joint is provided which allows the bearing in which the operating shaft is journaled to be adjusted relative to the casing without danger of stressing the shaft or otherwise impairing its efficiency.

While I have shown and described the preferred form of my construction, it is obvious that various changes in the construction and arrangement of parts of my improved bearing may be made and substituted for those herein shown and described without departing from the spirit of my invention.

I claim:

1. A seal comprising in combination with a casing to be sealed a sectional shaft, oppositely disposed convex members fixed to said shaft sections, a plate loosely arranged on said shaft between said convex members, and secured in sealed relation with said casing and concave members interposed between said plate and said convex members, each of said concave members having a flat side for engaging the respective face of said plate and a concave seat for receiving the convex face of the corresponding member.

2. A seal comprising in combination with a casing to be sealed a sectional shaft, oppositely disposed convex members fixed to said shaft sections, a plate loosely arranged on said shaft between said convex members, and secured in sealed relation with said casing, concave members interposed between said plate and said convex members, each of said concave members having a flat side for engaging the respective face of said plate and a concave seat for receiving the convex face of the corresponding member, and a spring for maintaining said members in sealing engagement with each other and with said plate.

3. A seal comprising in combination with a casing to be sealed interengaging shaft sections, oppositely disposed convex sealing members fixed to each shaft section, a stationary plate loosely arranged on said sectional shaft between said convex members, and secured in sealed relation with said casing, concave members loosely arranged on said shaft sections and interposed between said plate and the corresponding convex member, said concave members having their flat faces in sealing engagement with said plate and their concave portions in sealing engagement with the convex faces of the first-mentioned members, and a spring engaging the interengaged shaft sections for maintaining said parts in proper relation.

4. A seal comprising in combination with a casing to be sealed interengaging shaft sections, a semi-spherical member fixed to each section, a plate arranged between said members and secured in sealed relation with said casing, said plate having a central opening for accommodating said shaft, and a sealing member loosely arranged on each side of said plate and having a flat face in sealing engagement therewith and a semi-spherical recess for receiving the corresponding semi-spherical member.

5. A seal comprising in combination with a casing interengaging shaft sections, a semi-spherical member fixed to each section, a plate arranged between said members and having a central opening for accommodating said shaft, said plate being clamped in a sealed relation with said casing, a sealing member loosely arranged on each side of said plate and having a flat face in sealing engagement therewith, and a semi-spherical recess for receiving the corresponding semi-spherical member, and a tension member for maintaining said sealing members in sealing engagement with said plate.

6. A seal comprising in combination with a device to be sealed interengaging shaft sections, a semi-spherical member fixed to each section, a plate arranged between said members and having a central opening for accommodating said shaft, said plate being clamped in a fixed sealed relation with the wall of said device, a sealing member loosely arranged on each side of said plate and having a flat face in sealing engagement therewith, a semi-spherical recess for receiving the corresponding semi-spherical member, and a tension member for maintaining said semi-spherical members in proper relation with said sealing members.

7. A seal comprising in combination with a device to be sealed a bearing, a shaft journaled therein, a tubular section having telescopic and operative engagement with said shaft, oppositely disposed semi-spherical members fixed on said tubular section and said shaft, an apertured plate arranged on said shaft assembly between said semi-spherical members and secured in sealed relation with said device, a socket member arranged between each semi-spherical member and the corresponding side of said plate and in sealing engagement therewith, and a cover adapted to be secured in position and clamp said plate and said bearing in assembled relation.

8. A flexible seal comprising in combination with a casing to be sealed a bearing, a shaft journaled therein, said bearing being eccentrically mounted whereby the axis of said shaft may be adjusted, a plate loosely arranged on said shaft, and secured in sealed relation with said casing, a socket member arranged on each side of said plate and having its flat face in sealing engagement therewith, and a semi-spherical member fixed on said shaft to each side of said plate and having a sealing seat in the respective socket member.

9. A seal comprising in combination with a casing to be sealed a bearing, a sectional shaft journaled therein, said bearing being adapted to be eccentrically mounted whereby the axis of said shaft may be adjusted, a plate secured in sealed relation with said casing and having a central opening traversed by said shaft, a sealing member arranged on each side of said plate and having its flat face in sealing engagement therewith and an outwardly presented concave seat, a semi-spherical member fixed on each shaft section and having a bearing in the concave face of the respective sealing member, and a spring for interengaging said shaft sections and maintaining the semi-spherical members and parts associated therewith in sealing contact with each other.

10. A seal for bearings comprising in combination with a casing to be sealed a shaft having two interengaged sections, oppositely disposed sealing members arranged on said shaft sections, an intermediate member arranged on said shaft between said sealing members and secured in sealed relation with said casing, said member having a ball and socket engagement with said sealing members, and a spring for maintaining said members in sealing contact with each other.

11. A seal comprising in combination with a casing to be sealed a shaft having two interengaged sections, oppositely disposed sealing members arranged on said shaft sections, a sealing intermediate member arranged between said sealing members, said intermediate member being held stationary in sealed relation with said casing, and a spring for exerting pressure against one of said shaft sections and holding said sealing members in sealing contact with each other and with said stationary member.

In testimony whereof I hereunto affix my signature this 20th day of February, 1924.

JOHN O. CARREY.